No. 699,677. Patented May 13, 1902.
F. GREER.
MEDICAL BATTERY.
(Application filed Sept. 27, 1899.)
(No Model.)
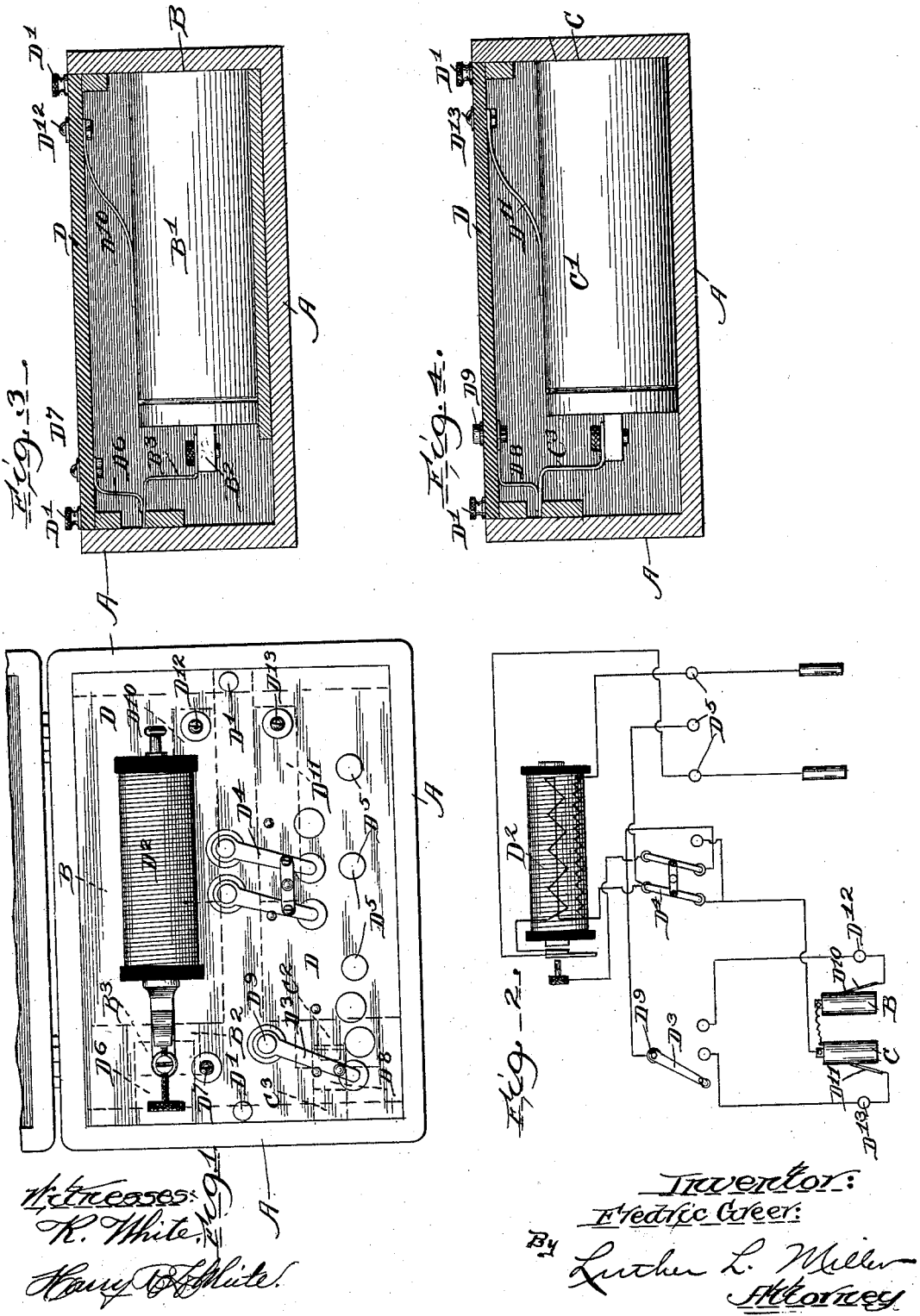

UNITED STATES PATENT OFFICE.

FREDRIC GREER, OF CHICAGO, ILLINOIS.

MEDICAL BATTERY.

SPECIFICATION forming part of Letters Patent No. 699,677, dated May 13, 1902.

Application filed September 27, 1899. Serial No. 731,874. (No model.)

*To all whom it may concern:*

Be it known that I, FREDRIC GREER, a citizen of the United States, residing at Chicago, in the county of Cook and State of Illinois, have invented certain new and useful Improvements in Medical Batteries, of which the following is a specification.

This invention relates particularly to the portable batteries used by physicians; but it is clear that my improvements are adaptable to almost any medical battery of common form.

Difficulty is frequently had by inexperienced users of the style of battery mentioned in making the proper connections between the Ruhmkorff coil, the switches and lines of the battery, and the cells; and the object of this invention is to provide a means for automatically making such connections by the mere act of mechanically securing the parts in position.

In the accompanying drawings, Figure 1 represents the interior of a battery-cabinet, showing in a plan view the hard-rubber base and the Ruhmkorff coil and switches thereon. Fig. 2 is a diagrammatic view of the battery, representing the lines thereof. Figs. 3 and 4 are longitudinal vertical sections through the lower part of the battery-cabinet, showing the cells and their contact connections with the lines of the base.

Like letters of reference indicate corresponding parts throughout the several views.

A is a cabinet of any suitable form for containing the battery.

B and C are two battery-cells in the lower part of the cabinet A. In this instance I have used the usual dry battery-cells in zinc casings, said casings being in electrical connection with the positive poles of the cells. B' and C' are the said zinc casings of the battery-cells B and C, respectively. The negative pole $B^2$ of the cell B has the contact-spring $B^3$ extending upward therefrom and in electrical communication therewith, while the negative pole $C^2$ of the cell C has a similar contact-spring $C^3$.

D is a hard-rubber base-plate secured in the cabinet A by the milled thumb-nuts D'. It bears the usual coil and vibrator $D^2$, the battery-switch $D^3$, the polarity-changing switch $D^4$, and the binding-post $D^5$, all common to batteries of this kind. A contact-spring $D^6$ is secured to the under face of the base-plate D by the binding-screw $D^7$. It has electrical connection with the lines of the said base-plate D and contact with the contact-spring $B^3$, secured to the negative pole of the battery-cell B. A contact-spring $D^8$ is secured by the studs $D^9$ to the under face of the base-plate D and likewise has electrical connection with the lines of the base-plate, also with the contact-spring $C^3$, secured to the negative pole of the battery-cell C.

$D^{10}$ and $D^{11}$ are contact-springs secured to the under face of the base-plate D by the studs $D^{12}$ and $D^{13}$, respectively. Both have electrical connection with the lines of the base-plate and each an electrical contact with the zinc casings B' and C' of the batteries B and C, respectively.

The cells B and C of the battery are connected as is shown in the diagrammatic view.

The primary single-battery circuit is as follows: battery C, positive pole, contact-spring $D^{11}$, stud $D^{13}$, battery-switch $D^3$, stud $D^9$, polarity-changing switch $D^4$, interrupter, primary winding of coil, polarity-changing switch $D^4$, battery C, negative pole. The two-battery primary circuit is as follows: battery B, positive pole, contact-spring $D^{10}$, stud $D^{12}$, battery-switch $D^3$, stud $D^9$, polarity-changing switch $D^4$, interrupter, primary winding of coil, polarity-changing switch $D^4$, battery C, negative pole.

By this construction I am enabled to lift the hard-rubber base D after unscrewing the milled nuts D' and remove it from the battery. The cells B and C of the battery may also be freely removed from the cabinet, the mere act of replacing the base D when the battery is in position reëstablishing the electrical connections between the lines of the board and the cells of the battery.

I claim as my invention—

1. In a medical battery, in combination, an inclosing case containing a cell having a contact-spring secured to its negative pole; a base-plate carrying a coil on one of its surfaces; and two contact-springs on the other surface of said base-plate, respectively adapted to engage the contact-spring of the negative pole of the cell and the casing of said cell.

2. In a medical battery, in combination, a battery comprising a plurality of cells; a coil; a base-plate carrying said coil on its upper surface; a contact-spring secured to the lower surface of said base-plate, for each of said cells, for making electrical connection between the casing of said cell and the lines of the coil; and a contact-spring projecting downward from the lower face of said base-plate, for each of said cells, for making electrical connection between one of the poles of said cell and the lines of the coil.

3. In a medical battery, in combination, a battery comprising a plurality of cells, each cell being provided with a contact-spring secured to its negative pole; a coil; a switch; a base-plate carrying said coil and said switch on its upper surface; a contact-spring secured to the lower surface of said base-plate, for each of said cells, for making electrical connection between the casing of said cell and the lines of the coil; a contact-spring projecting downward from the lower face of said base-plate, for each of said cells, for making electrical connection between the contact-spring secured to the negative pole of said cell and the lines of the coil.

FREDRIC GREER.

Witnesses:
GEO. L. CHINDAHL,
LUTHER L. MILLER.